R. A. FESSENDEN.
METHOD AND APPARATUS FOR SUBMARINE SIGNALING.
APPLICATION FILED JULY 21, 1919.

1,394,483.

Patented Oct. 18, 1921.

WITNESS:

INVENTOR.

UNITED STATES PATENT OFFICE.

REGINALD A. FESSENDEN, OF CHESTNUT HILL, MASSACHUSETTS, ASSIGNOR TO SUBMARINE SIGNAL COMPANY, OF PORTLAND, MAINE, A CORPORATION OF MAINE.

METHOD AND APPARATUS FOR SUBMARINE SIGNALING.

1,394,483.  Specification of Letters Patent.  Patented Oct. 18, 1921.

Application filed July 21, 1919. Serial No. 312,318.

*To all whom it may concern:*

Be it known that I, REGINALD A. FESSENDEN, of Chestnut Hill, in the county of Middlesex and State of Massachusetts, a citizen of the United States, have invented new and useful Improvements in Methods and Apparatus for Submarine Signaling, of which the following is the specification.

My invention relates to methods and apparatus for transmitting and receiving compressional waves in elastic media, and more particularly to submarine signaling.

My invention has for its object increased efficiency in the transmission and receipt of signals in elastic media, and more particularly increased efficiency in submarine signaling, and still more particularly the elimination in the receiving apparatus of the disturbing effect of emitted signals, and of the disturbing effect of extraneous noises.

Figure 1:
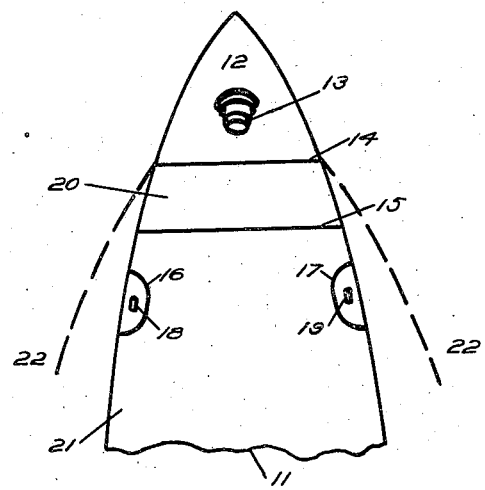
Figure 2:
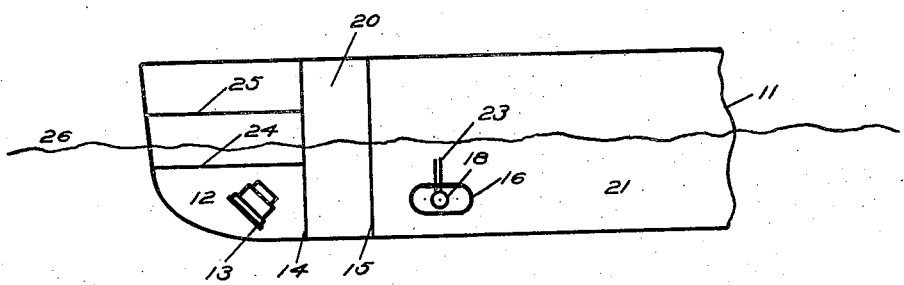

Figures 1 and 2 show, partly diagrammatically, apparatus adapted for carrying out my inventions.

Heretofore in submarine signaling, where sensitive receivers, especially of the microphonic type, were used, said receivers have been liable to injury or to being put out of adjustment if strong signals were emitted in the neighborhood. For this reason it has been impossible to use such receivers on shipboard or on lightships in conjunction with powerful sources of signals.

Also when navigating in a fog, it has been impossible to emit sound signals to warn other vessels, and simultaneously to listen on said sensitive receivers to signals emitted by said other vessels.

The method and apparatus of this invention overcomes these difficulties, and has other advantages.

In Figs. 1 and 2, 11 represents the fore part of a vessel, 12 being the forepeak; 13, a source of sound, preferably an oscillator, preferably inclined as shown, and immersed in a liquid, preferably water, or oil contained in the forepeak 12; 14 and 15 bulkheads inclosing the compartment 20; 21 the forehold of the vessel; 16 and 17 fluid filled tanks fastened to the sides of the vessel as shown; 18 and 19 microphonic receivers of the ordinary submarine type.

In Fig. 2, 23 are the leads of the microphonic receiver 18, and 26 is the water line.

The relative positions of the forepeak 12, bulkhead 14, and tanks 16 and 17, and receivers 18 and 19 is such that the sound shadow thrown by the edges of the bulkhead 14 when sounds are emitted by the oscillator 13, has the form bounded by the lines 22—14—22, the tanks 16 and 17 being as shown in the sound shadow, and therefore not substantially affected when sounds are produced by the oscillator 13.

With this arrangement therefore the oscillator 13 may be sounded without injuring or putting out of adjustment the receivers 18 and 19, and also signals from other vessels may be received on the receivers 18 and 19 at the same time that the oscillator 13 is being used for emitting signals.

Still better results are obtained by the use of the second bulkhead 15 so that the compartment 20 separates the fluid in the forepeak 12 from the air in the forehold 21.

Applicant has also discovered that greatly improved results can be obtained if, instead of merely placing the oscillator 13 in the forepeak, the oscillator is placed at the bottom of the forepeak and a horizontal and preferably water-tight bulkhead 24 is built across the forepeak, and preferably at some distance below the water line as shown.

When this is the case the action of the oscillator in emitting signals is more uniform, and also the oscillator may be better used to receive signals as it is found in practice, for reason not definitely known, to be much less subject to external disturbances.

Also another important advantage is that if it is desired to lighten the bow of the vessel, and therefore to pump the water in the forepeak low, without the bulkhead 24 the oscillator 13 will be at times uncovered, since there being little water in the forepeak, when the vessel rolls, the oscillator may be partly out of the water, and will also be more disturbed by water noises.

Still further carrying out the results of applicant's observations, a second horizontal bulkhead 25 may also be used, in which case the space between the bulkheads 25 and 24 may be pumped free of liquid while the forepeak above the compartment 25 may be filled with a liquid such as oil or water or may be left empty as desired; and the forepeak below the bulkhead 24 may be kept filled with a fluid such as oil or water.

The method herein described is applicable to airships as well as submarines, and various modifications of the method will suggest themselves to those skilled in the art.

What I claim is—

1. In the art of submarine and airship signaling, a vessel, a source of sound located on said vessel, a receiver of sound located on said vessel, and a sound shadow producing means located between said source of sound and said receiver of sound.

2. In the art of submarine and airship signaling, a vessel, a fluid filled compartment in said vessel, a source of sound immersed in said fluid filled compartment, a sound receiver located externally to said fluid filled compartment, and a wall of said fluid filled compartment so placed as to throw the sound receiver into sound shadow as regards the sound source.

3. In the art of submarine and airship signaling, a vessel, a fluid filled forepeak compartment comprising a bulkhead and containing a sound source, two sound receivers located in the vessel and external to said fluid filled forepeak compartment, and in the sound shadow, as regards the source of sound, of the bulkhead of said forepeak.

REGINALD A. FESSENDEN.